United States Patent [19]

Matsumoto

[11] 4,451,524

[45] May 29, 1984

[54] POLYPROPYLENE STRAP AND METHOD OF MANUFACTURING THE SAME

[75] Inventor: Hiroyuki Matsumoto, Tokyo, Japan

[73] Assignee: Tsukasa Kasei Kogyo Kabushiki Kaisha, Tokyo, Japan

[21] Appl. No.: 500,382

[22] Filed: Jun. 2, 1983

[30] Foreign Application Priority Data

Jan. 14, 1983 [JP] Japan .................................... 58-3305

[51] Int. Cl.³ .......................... B32B 7/02; B32B 9/00; D01D 5/12
[52] U.S. Cl. .................................... 428/213; 428/409; 428/910; 428/215; 156/229; 264/210.7
[58] Field of Search ............... 428/213, 215, 409, 910; 156/244.24, 229; 264/230, 210.2, 210.7

[56] References Cited

U.S. PATENT DOCUMENTS

| | | | |
|---|---|---|---|
| 3,394,045 | 7/1968 | Gould | 428/409 |
| 4,283,453 | 8/1981 | Siefried et al. | 428/409 |
| 4,287,249 | 9/1981 | Eustance et al. | 428/409 |
| 4,367,511 | 1/1983 | Cross et al. | 428/409 |

*Primary Examiner*—Marion McCamish
*Assistant Examiner*—Beverly K. Johnson
*Attorney, Agent, or Firm*—Oblon, Fisher, Spivak, McClelland & Maier

[57] ABSTRACT

A polypropylene strap for use in packaging articles. The polypropylene strap has a high tensile strength, a low elongation, a high rigidity, a high abrasion resistance, and flexible surfaces, and it is not easily split in the longitudinal direction. This strap has superficial layers stretched at a low draw rate of 1.2–3, and an inner portion stretched at a high draw rate of 10–18. The total thickness of the superficial layers is 5–50% of the total thickness of the strap. The strap is manufactured by stretching a belt-like material, which has been extruded from a die, in the lengthwise direction thereof at a volume ratio of 4–9, heating the surfaces of the resulting belt-like material to put the molecular chains in the superficial layers only thereof in a non-oriented state, and then stretching the belt-like material as a whole at a draw ratio of 1.2–3.

2 Claims, 6 Drawing Figures

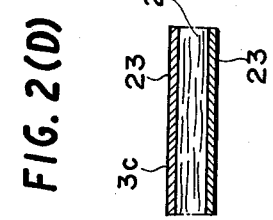
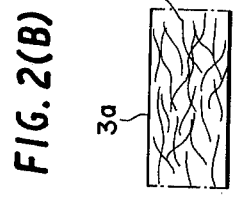
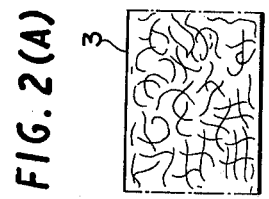
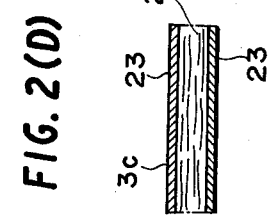
FIG. 2(A) FIG. 2(B) FIG. 2(C) FIG. 2(D)
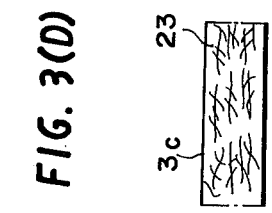
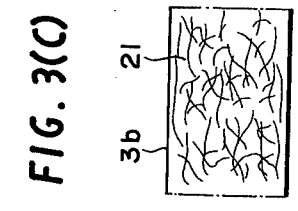
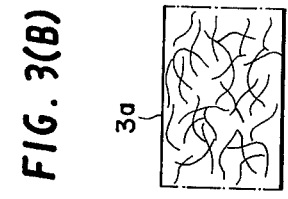
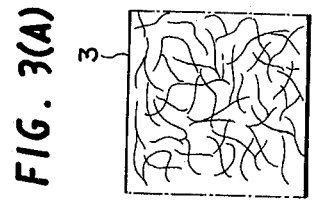
FIG. 3(A) FIG. 3(B) FIG. 3(C) FIG. 3(D)

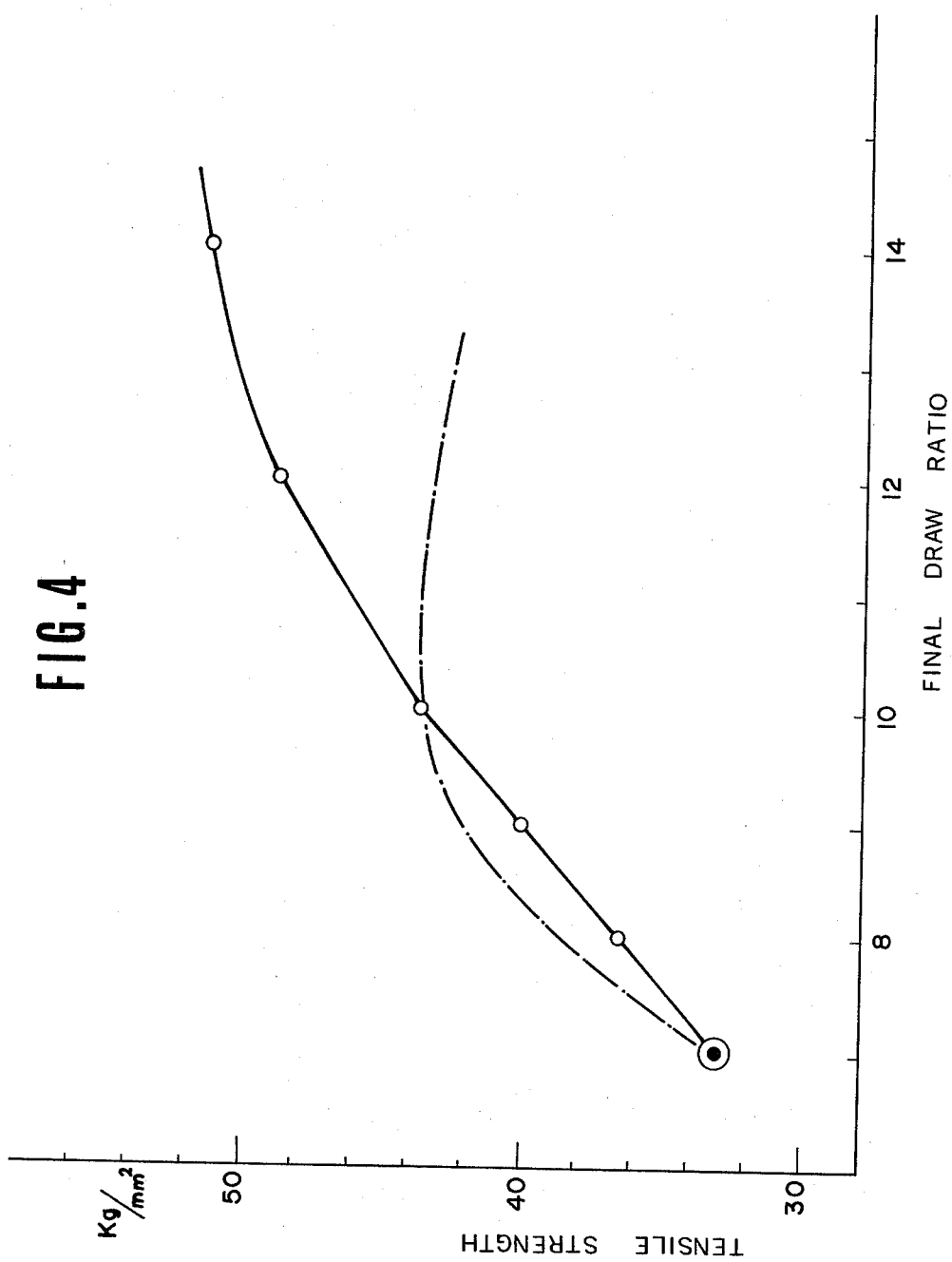

POLYPROPYLENE STRAP AND METHOD OF MANUFACTURING THE SAME

BACKGROUND OF THE INVENTION

1. Field of the Invention

This invention relates to a polypropylene strap which is used to package articles and to a method of manufacturing the same. The polypropylene strap has a high tensile strength and a low elongation as compared with conventional polypropylene straps of this kind. Furthermore, the polypropylene strap has a high rigidity and a high abrasion resistance, again in comparison to conventional polypropylene straps of this kind.

2. Description of the Prior Art

Polypropylene is widely used at present for manufacturing regular packaging straps because of its comparatively low price. However, polypropylene straps are subject to longitudinal splitting. In order to prevent such occurrences, the surfaces of polypropylene straps are conventionally subjected to an embossing process.

It is preferable that packaging straps have high tensile strength and not be elongated significantly when stretched. A packaging strap having such properties pervents a packaged article from being deformed. In order to use a packaging strap in an automatic strapping machine, it is necessary that the strap have an excellent adaptability to the machine. In particular, a packaging strap which is to be used in a strapping machine must have a smooth surface, a high rigidity (firmness), a high abrasion resistance, and a flexible soft surface.

The tensile strength of polypropylene straps is related to the draw (or stretch) ratio (that is, to the rate of orientation of the molecular chains in the straps) of the material. However, in order for the polypropylene strap to have an adequate tensile strength, the draw ratio is limited to around 10. When the draw ratio of the material is increased to over 10, the tensile strength of the resulting strap is put in a plateau-like state in which the tensile strength is decreased, or a so-called "whitening phenomenon" occurs in the strap. As a result, the abrasion resistance of the strap is decreased to a great extent, and the strap cannot be used practically.

There is a known method (disclosed in U.S. Pat. No. No. 3,394,045) of improving the abrasion resistance of a stretched plastic sheet by subjecting the plastic sheet to flash heating to melt a superficial layer only thereof, thereby putting the molecules in the layer in a non-oriented state. Packaging straps obtained by cutting such a plastic sheet to a predetermined width are now on the market.

Although a strap thus obtained has a flexible surface and an improved abrasion resistance, it does not have improved tensile strength, elongation resistance, and rigidity.

OBJECTS OF THE INVENTION

An object of the present invention is to provide a polypropylene strap not requiring subjection to a surface-embossing process to prevent it from being longitudinally split, but which has a tensile strength nearly two times as high as that of a conventional polypropylene strap; an elongation resistance close to that of a commercially available polyester strap; and high ridigity; and a comparatively flexible surface. Moreover, it is an object of the present invention to provide such a strap which is capable of being used in an ordinary packaging machine even if the strap has a small thickness.

SUMMARY OF THE INVENTION

The foregoing objects are accomplished according to the invention by providing a method of manufacturing polypropylene straps, which method comprises the steps of passing a polypropylene sheet, which has been forced out from an extruder, through a preheating tank; immediately subjecting the sheet to a first stretching at a draw ratio of 4-9; subjecting the resulting sheet to heat treatment to form non-molecule-oriented layers on both sides thereof; cooling these layers to solidify the same; and subjecting the sheet to a second stretching at a draw ratio of 1.2-3 while heating the same. By this method a final polypropylene sheet which has been stretched 10-18 times internally and which has an elongation of 1.2-3 in the superficial layers can be obtained. The polypropylene sheet thus obtained has smooth surfaces, since the surfaces are not embossed, and different rates of orientation of molecular chains in the superficial layers and the inner portion of the sheet.

The above and other objects as well as advantageous features of the invention will become apparent from the following description of the preferred embodiment taken in conjunction with the accompanying drawings.

BRIEF DESCRIPTION OF THE DRAWINGS

FIGS. 2A-2D are side elevational views in section illustrating the molecular orientation in a strap according to the present invention in various stages of the method shown in FIG. 1.

FIGS. 3A-3D are plan views corresponding to FIGS. 2A-2D.

FIG. 4 is a graph showing the relation between the final draw ratio used and the tensile strength of a strap obtained in an embodiment of the present invention.

DESCRIPTION OF THE PREFERRED EMBODIMENT

Figure 1:
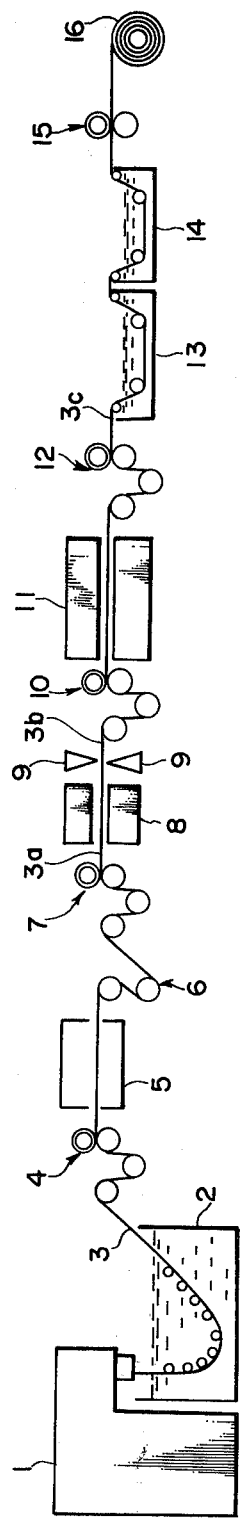
FIG. 1 is a schematic diagram illustrating the steps of manufacturing straps according to the present invention.

A method of manufacturing polypropylene straps according to the present invention will now be described with reference to FIG. 1. Reference numeral 1 denotes an extruder adapted to melt a pelletized polypropylene resin therein and to extrude the molten polypropylene from a die at a temperature of between 215° C. and 220° C. and in the shape of a belt-like sheet 3 having a thickness of about 3 mm. Reference numeral 2 denotes a cooling water tank for use in cooling and solidifying the sheet 3 after it has left the extruder 1. Refrence numeral 4 denotes first take-up rolls, and reference numeral 5 denotes a preheating tank having an internal temperature of 100°-200° C. Reference numeral 6 denotes a first stretching means, which in this embodiment is a pair of short-distance stretching rolls, but which may be any other suitable device capable of stretching the sheet 3 at a volume ratio of about 4-9 (thereby reducing the thickness thereof to a great extent).

Reference numeral 7 denotes second take-up rolls, and reference numeral 8 denotes a surface treating means in which the now stretched sheet 3a is brought close to flames of 700°–900° C. and passed therethrough at about 25 m/min to heat the surfaces thereof and thereby put some of the molecules in the superficial layers 21 (shown in FIGS. 2C and 3C) in a non-oriented state. After the stretched sheet 3a has been surface heated, the resulting stretched, surface-heated sheet is denoted by the reference number 3b. Reference numeral 9 denotes coolers, and reference numeral 10 denotes third take-up rolls.

Reference numeral 11 denotes a stretch-heating tank having an internal temperature of 200°–300° C. The stretch-heating tank 11 is adapted to heat the surfaces 21 of the sheet 3b while the sheet 3b is being further stretched 1.2–3 times by the tensile force applied thereto by fourth take-up rolls 12. The fourth take-up rolls 12 are rotated at a speed higher than that of the third take-up rolls 10, which causes the superficial layers 21 to be stretched. The resulting twice-stretched and surface-heated sheet is denoted by the numeral 3c.

While the sheet 3b passes through the stretch-heating tank 11, the width and thickness thereof are reduced, and a final produce (i.e., the strap 3c) which has a width of 9–19 mm and a thickness of 0.1–1 mm is obtained.

Reference numeral 13 denotes an annealing tank manitained at 100° C., and reference numeral 14 denotes a cooling tank maintained at 25° C. Reference numberal 15 denotes fifth take-up rolls, and reference numeral 16 denotes a take-up means.

FIGS. 2A–2D and 3A–3D are longitudinal sectional views and plan views, respectively, illustrating the molecular orientation in the strap according to the present invention in various sequential stages of the manufacture thereof.

In the sheet 3 forced out from the extruder 1, the molecular chains are entangled at random as shown in FIGS. 2A and 3A.

In the stretched sheet 3a, which has been subjected to a short-distance stretching (first stretching) step, the molecular chains are oriented considerably in the lengthwise direction of the material, as shown in FIG. 2B, and also in a biaxial direction in the outer surfaces of the material, as shown in FIG. 3B. This shows that the material 3a is not readily split in the longitudinal direction thereof.

In the sheet 3b, which has passed through the surface treating means 8, the molecular chains in the superficial layers 21 only are in a non-oriented state as clearly shown in FIGS. 2C and 3C, while the orientation of the molecular chains in the inner portion 20 is not changed.

In the sheet 3c, which has been subjected to a second stretching step, superficial layers 23 are stretched at a low ratio (2–5), while the inner portion 22 is stretched at high ratio (10–18), as shown in FIGS. 2D and 3D.

EXAMPLE 1

Polypropylene pellets (MI=1) were forced out at 215° C. from a die in an extruder in the apparatus shown in FIG. 1, and the extruded resin was subjected to a first stretching step at a draw ratio of 7.

The resulting belt-like material had a width of 25 mm, a thickness of 0.45 mm, a strength of 33 kg/mm$^2$, and an elongation of 28%.

This belt-like material 3a was passed through a surface treating means 8, which put the superficial layers 21 of 20μ in depth into a non-oriented state. The strength and elongation of the resulting belt-like material 3b were 30 kg/mm$^2$ and 30%, respectively. This material was stretched two times as it was passed through the second stretch-heating tank 11 to obtain a strap 3c having a width of 14 mm and a thickness of 0.40 mm.

In the strap 3c, the inner portion 22 was stretched 14 times, and the superficial layers 23 two times. The thickness of each of the superficial layers 23 was 18μ. The strength and elongation of this strap 3c were 51 kg/mm$^2$ and 12%, respectively.

Figure 5:
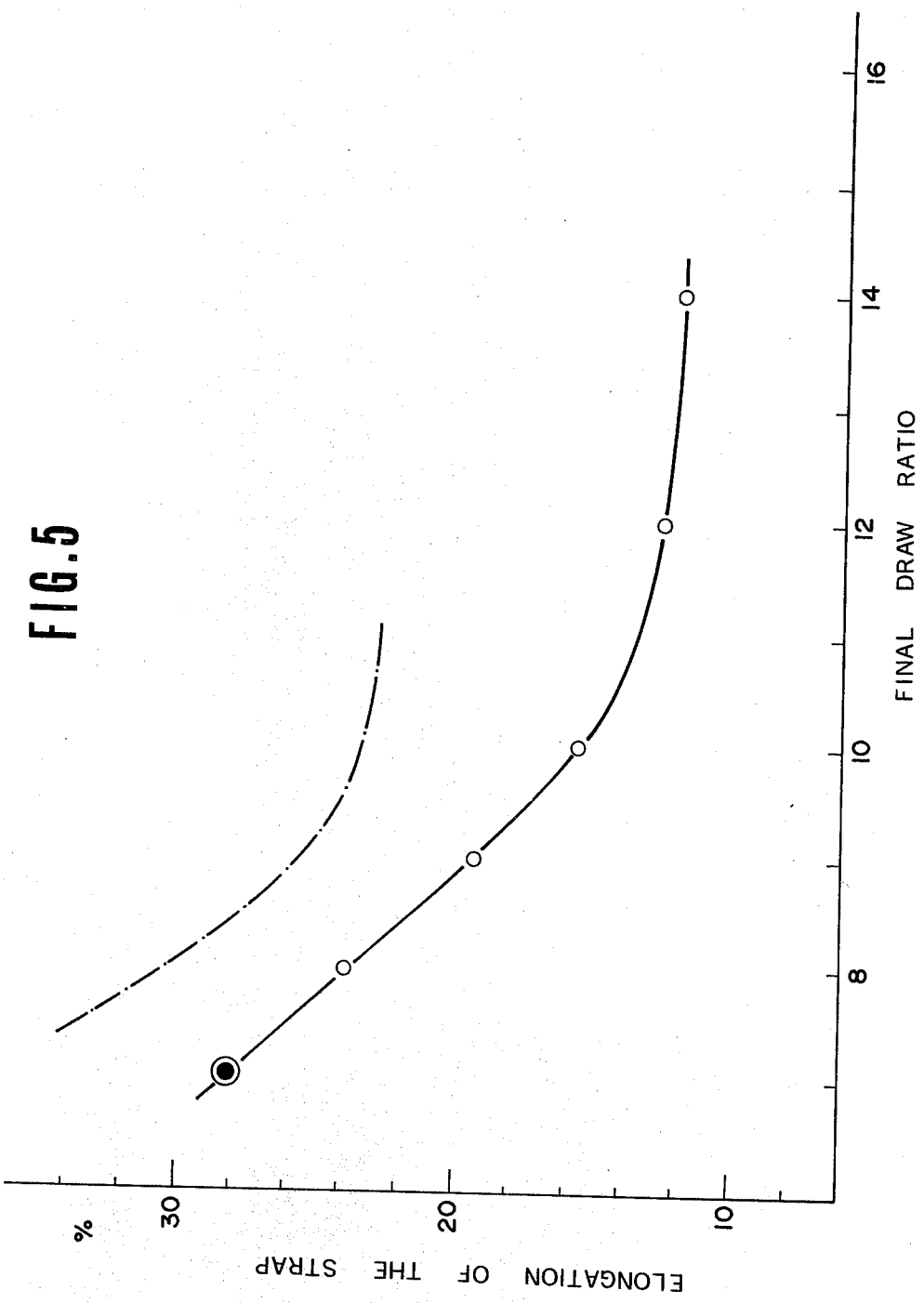
FIG. 5 is a graph showing the relation between the final draw ratio used and the elongation of the strap in the same embodiment.

The results of measurement for determining the relation between (a) the draw ratio and the strength of a final product and (b) the draw ratio and the elongation of the final product for the above-described embodiment are shown in FIGS. 4 and 5, respectively. The chain curves in FIGS. 4 and 5 represent the results of similar measurements conducted with respect to a strap obtained by a conventional method and constituting a comparative example.

Figure 6:
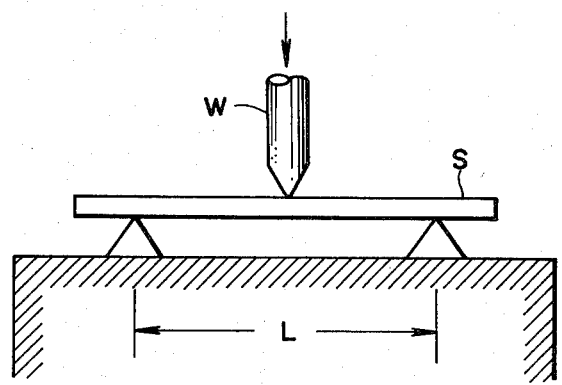
FIG. 6 is an illustration of a method of testing the rigidity of a strap.

As shown in FIG. 6, a test piece S having a length of 70 mm was set on supports the center of which were spaced at a distance L=50 mm, and a knife edge W having a tip radius of 0.5 mm was disposed so as to contact the test piece S with the central portion of the test piece S connected to a free end of an autographic load sensitive chuck. The resilient force (resistance) of the test piece S was determined in terms of gr when the test piece S was bent by being pressed downward by a predetermined distance at a speed of 200 mm/min. The value thus obtained was divided by the weight per 1 m of the test piece to determine the rigidity of the test piece.

The rigidities of the conventional strap and the strap obtained in the above embodiment, which were measured by the foregoing method, were 77 gr/gr and 94 gr/gr, respectively. That is, it was ascertained that the strap according to the present invention is superior with respect to rigidity as well. (Measuring conditions: 20° C., sample straps having a width of 16 mm.)

According to the present invention, the superficial layers 23 are stretched to a smaller extent and the inner portion 22 is stretched to a larger extent, and the thicknesses of the superficial layers 2b and the inner portion 22 are determined depending upon the properties desired in the strap. In order to obtain a strap having a high tensile strength, better effects can be obtained if the draw ratio in the first stretching step is set to a high level than if the draw ratio in the first stretching step is set to a low level even if total ratios in both of these cases are equal. The draw ratio in the first stretching step is preferably in the range of around 6–8. When the thickness of the superficial layers 23 is larger, the elongation of the strap is naturally increased.

Therefore, the total thickness of the two superficial layers 23 should be 50% of the total thickness at most, and the total thickness of the two superficial layers 23 is preferably in the range of 5–30% of the total thickness of the strap.

The draw ratio in the second stretching step influences the flexibility of the surfaces of the strap; it should be not more than 3.

The present invention is not, of course, limited to the above embodiment; it may be modified in various ways within the scope of the appended claims.

What is claimed as new and desired to be secured by Letters Patent of the United States is:

1. A polypropylene strap formed from a single polypropylene sheet in which both surface layers are stretched at a low draw ratio of 1.2–3 and an inner portion is stretched at a high draw ratio of 10–18.

2. A polypropylene strap as recited in claim 1 wherein the total thickness of said surface layers is in the range of 5–30% of the total thickness of said strap.

* * * * *

REEXAMINATION CERTIFICATE (784th)
United States Patent [19]
Matsumoto

[11] B1 4,451,524

[45] Certificate Issued  Nov. 10, 1987

[54] POLYPROPYLENE STRAP AND METHOD OF MANUFACTURING THE SAME

[75] Inventor: Hiroyuki Matsumoto, Tokyo, Japan

[73] Assignee: Tsukasa Kasei Kogyo Kabushiki Kaisha, Tokyo, Japan

Reexamination Request:
No. 90/001,041, Jun. 23, 1986

Reexamination Certificate for:
Patent No.: 4,451,524
Issued: May 29, 1984
Appl. No.: 500,382
Filed: Jun. 2, 1983

[30] Foreign Application Priority Data

Jan. 14, 1983 [JP] Japan .................. 58-3305

[51] Int. Cl.$^4$ .............. B32B 7/02; B32B 9/00; D01D 5/12
[52] U.S. Cl. .................. 428/213; 156/229; 264/210.7; 428/215; 428/409; 428/910

[56] References Cited

U.S. PATENT DOCUMENTS

| | | | |
|---|---|---|---|
| 3,394,045 | 7/1968 | Gould | 428/409 |
| 3,619,460 | 11/1971 | Chill | 428/409 |
| 3,651,196 | 3/1972 | Starkweather | 264/178 |
| 3,746,608 | 7/1973 | Takahashi | 428/409 |
| 3,758,661 | 9/1973 | Yamamoto et al. | 264/230 |

FOREIGN PATENT DOCUMENTS 38559 10/1981 European Pat. Off.
87533 7/1980 Japan.

OTHER PUBLICATIONS

Bigg "A Review of Techniques for Processing Ultra-High Modulus Polymers", Polymer Engineering and Science, Nov. 1976, vol. 16, No. 11, p. 725.

*Primary Examiner*—George F. Lesmes
*Attorney, Agent, or Firm*—Robert T. Pous; C. Irvin McClelland

[57] ABSTRACT

A polypropylene strap for use in packaging articles. The polypropylene strap has a high tensile strength, a low elongation, a high rigidity, a high abrasion resistance, and flexible surfaces, and it is not easily split in the longitudinal direction. This strap has superficial layers stretched at a low draw rate of 1.2-3, and an inner portion stretched at a high draw rate of 10-18. The total thickness of the superficial layers is 5-50% of the total thickness of the strap. The strap is manufactured by stretching a belt-like material, which has been extruded from a die, in the lengthwise direction thereof at a volume ratio of 4-9, heating the surfaces of the resulting belt-like material to put the molecular chains in the superficial layers only thereof in a non-oriented state, and then stretching the belt-like material as a whole at a draw ratio of 1.2-3.

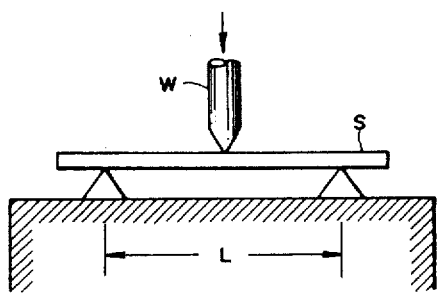

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

1. A polypropylene strap consisting of a single polypropylene sheet in which both surface layers are stretched at a low draw ratio of [1.2-3] *2* and an inner portion is stretched at a [high] draw ration of [10-18] *14*, wherein said strap has a tensile strength of [between about 49 kg/mm² and] about 51 kg/mm².

* * * * *